United States Patent
Olsson

[15] 3,663,939
[45] May 16, 1972

[54] COMBINATION TEST BOX AND BATTERY CHARGER

[72] Inventor: Hans Olsson, 40 Merril Street, San Francisco, Calif. 94134

[22] Filed: Dec. 21, 1970

[21] Appl. No.: 99,894

[52] U.S. Cl. ............................................. 320/48, 324/51
[51] Int. Cl. ............................................. G01r 31/02
[58] Field of Search ............ 324/15, 51; 320/2, 39, 48

[56] References Cited

UNITED STATES PATENTS

| | | | |
|---|---|---|---|
| 3,428,888 | 2/1969 | Nolte | 324/51 |
| 3,521,142 | 7/1970 | Ludlam | 320/39 |
| 3,528,104 | 9/1970 | Ehlschlager | 324/51 |
| 3,103,808 | 9/1963 | Eichelberger | 324/51 X |
| 3,579,280 | 5/1971 | Florance | 324/51 |

Primary Examiner—J. D. Miller
Assistant Examiner—Robert J. Mickey
Attorney—Alfons Puishes

[57] ABSTRACT

This invention comprises a portable test box for checking the electrical circuits between a tractor and a trailer, as employed in typical diesel or other tractor-trailer arrangements. Essentially a maintenance device, it is constructed so as to be connectible between the wires coming from the tractor and those leading to the trailer so that by proper manipulation of switches rapid indication of open, grounded, or short circuits in the lighting and other wiring is readily indicated. The novel construction permits use of either the vehicle's battery as a source of power for testing or an outside source of power. The novel construction and circuitry permits also the use of the device for charging of the vehicle battery from an outside source.

2 Claims, 3 Drawing Figures

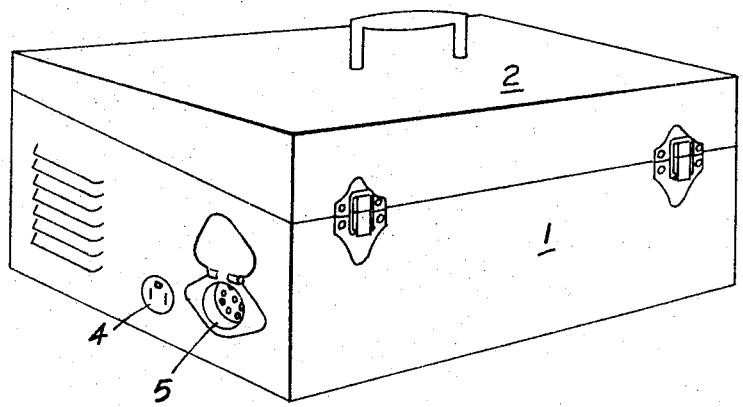
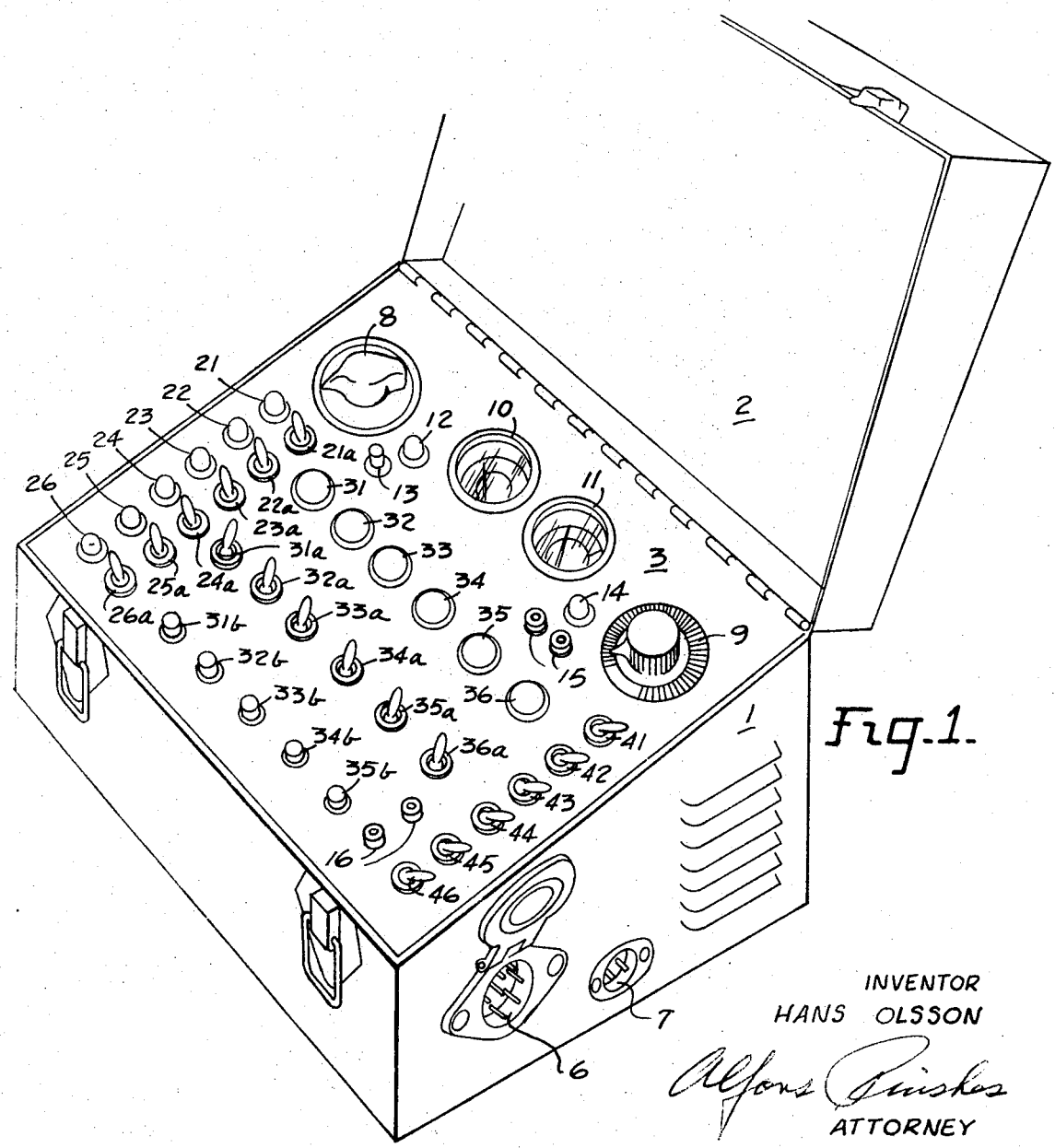

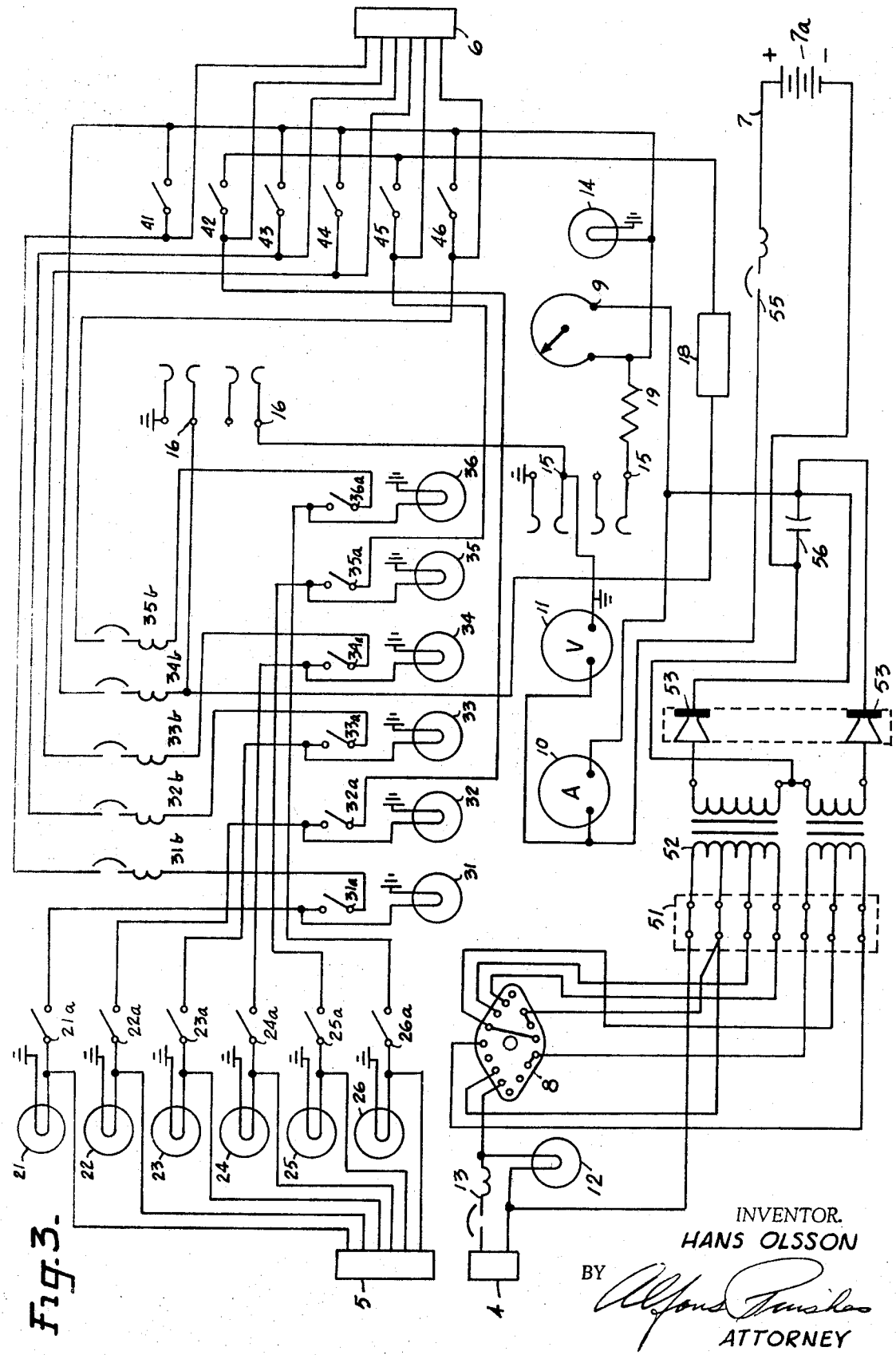

COMBINATION TEST BOX AND BATTERY CHARGER

BACKGROUND OF THE INVENTION

Many devices and numerous forms of apparatus have been constructed and in use for some time to assist in the maintenance of automotive vehicles and related equipment. All previous devices have been limited to testing of individual components of the vehicle, such as the ignition system, or the lighting system or the signal system. Complete and thorough check-out of the electrical systems still requires testing of individual circuits by means of test lamps or other devices to determine whether the circuit is open, grounded or shorted. This entails considerable cost in time and labor. Existing devices invariably rely on an outside source of power and in the few cases where the vehicle power itself may be used the two are not interchangeable. No existing devices provide a means for charging the vehicle battery from an outside source as well as testing out the electric circuit.

SUMMARY OF THE INVENTION

In my device I combine all necessary components or testing elements and place them in a single portable box equipped with a control panel or console. I employ an interconnecting circuitry which gives me an unusual combination, providing great flexibility and versatility.

I have discovered that by the use of the construction and circuitry of my invention I am able to accomplish all of the maintenance requirements of this sort in one device which has never been done heretofore. More specifically I may insert my device in the wiring between a tractor and a trailer in order to effect my testing of the wiring of either or I may use it to check the tractor and trailer wiring independently and individually.

I have discovered further that I am able to combine by the use of my novel construction the foregoing testing functions of my device and circuitry with the function of charging vehicle storage batteries by utilizing an outside source of power fed through my device.

I may also use the battery power itself for testing where an outside source is not readily available.

DESCRIPTION OF THE DRAWINGS

FIG. 1 is an isometric view of the test box of my invention open to show the console.

FIG. 2 shows my test box in a closed position to illustrate its portability.

FIG. 3 is a wiring diagram showing the circuitry which I employ to get my unusual results.

DESCRIPTION OF A PREFERRED EMBODIMENT

Referring now to the figures in which like numbers represent like components, the numbers shown on FIG. 1 which give the physical position of the important components are related to the corresponding numbers on FIG. 3 which shows their inter-connection with the other components in my circuitry.

My portable device is located in a case 1, having a cover 2, and a console 3 in the upper portion of case 1. Various switches and lights are positioned on the panel of the console and the electrical components which actually perform the test functions are located below it inside the box where they are properly inter-connected.

A standard receptacle 4 which would normally be adapted to receive a 110 or 115 AC supply is located on one face of case 1. A six wire receptacle 5 is located also on the side of case 1 adjacent to receptacle 4 and is adapted to receive connections from the trailer. A six prong receptacle 6 is located on the opposite face of case 1 and is adapted for connection with the wires to the tractor. Connector 7 located near 6 also on the side of case 1 is adapted for the purpose of battery charging as will be set forth more fully below.

On the face of the console is selector switch 8 which connects to the selector itself and serves to vary the paths or connections to the terminal block 51 and hence to the primary of transformer 52 in order to supply flexibility of AC supply voltage to the system.

Rheostat 9 serves to cut down the current whose values are indicated on ammeter 10 and voltmeter 11, these serving also as a battery checker when charging.

AC pilot light 12 connected as shown and circuit breaker 13 serve to indicate and protect the AC supply from 4, respectively.

DC pilot light 14 is located and connected as shown to indicate the operation of the circuit associated with rheostat 9 and its accompanying components.

At 15 and 16 are shown terminals and their accompanying jacks which may be used for high power and low power testing of various portable electrical devices in use on the vehicle. Flasher 18 is connected as shown and performs the function of testing such signal lights as require flashing as is well known in the automotive art. Resistor 19 is connected as shown in order to adapt connection 15 to high power testing as distinguished from connector 16 which is utilized for low power testing as may be required by the device being tested.

Test lights 21 through 26 and their connecting switches 21a to 26a are used for testing the circuits to the stop-turn light, left-turn light, interior light, tail-light, right-turn light, and marker light respectively. Test lights 31 through 36 inclusive and their accompanying switches 31a to 36a inclusive and the accompanying circuit breakers 31b to 35b are used for testing for short circuits on the stop-light, left-turn light, interior lights, tail-light, right-turn light, and marker light respectively. The circuit breakers 31b through 35b inclusive are identified by their reset buttons on the console of FIG. 1.

Switches 41 through 46 connect through receptacle 6, previously mentioned, to the trailer so that the corresponding circuits on the latter may be connected successively to the circuits in my test box as shown.

Referring back again now to the AC supply at 4, previously described, there are seen connections through the selector 8 to terminal block 51 and the primary of a transformer 52, also previously mentioned. This transformer is purposely two-winding to allow greater flexibility in varying AC inputs to my charging circuits to accomodate different batteries. The charging circuit includes twin semiconductor rectifiers 53 which connect through condenser 56 and circuit breaker 55 to battery connection 7 and storage battery of the vehicle 7a. In this manner I am able to use the outside AC supply to charge the battery of the vehicle while at the same time performing the test functions of the vehicle circuits as set forth above and which will be evident to those skilled in the art from an inspection of the figures.

OPERATION

While the various manner in which I may employ my combination test box and battery charger should now be evident to those skilled in the art, some typical procedures are outlined briefly below.

When a tractor - trailer is brought into the shop for maintenance the electrical connections between the two vehicles are disconnected. The terminals from the trailer are then plugged into receptacle 5 and those from the tractor to receptacle 6.

By closing switches 21a through 26a successively an open circuit on any of the light circuits on the trailer will be indicated by lights 21 through 26 respectively.

By closing switches 31a through 36a successively a short circuit on any of the circuits on the trailer will be indicated by lights 31 through 36 and the blowing of circuit breakers 31b through 35b respectively.

The circuits to the tractor may then be similarly tested by successively closing switches 41 through 46.

The tremendous saving in time and labor which I am able to effect by the use of my invention should now be evident to those skilled in the art.

I claim:

1. An apparatus for testing and servicing the electrical system of an automotive tractor - trailer vehicle combination equipped with an electrical storage battery power supply comprising:
   a portable box;
   a first set of electrical connectors external to said box adapted for connecting to a plurality of electrical terminals of said system servicing the trailer member of said vehicle combination;
   a second set of electrical connectors external to said box adapted for connecting to a plurality of electrical terminals of said system serving the tractor member of said vehicle combination;
   a first plurality of manual switches interconnected with indicating and automatic circuit interrupting devices positioned within said box and connecting with said first set of external electrical connectors;
   a second plurality of manual switches interconnecting with said first plurality of switches positioned within said box and connecting with said second set of external electrical connectors;
   whereby successive manipulation of said manual switches produces an indication of defects in relevant parts of said electrical system.
   said manual switches and said indicating and automatic circuit interrupting devices being interconnected through an internal test circuit positioned within said box to provide selective individual testing of a plurality of circuits served by said external electrical connectors;
   said apparatus being further characterized by the complete absence of any portable external testing terminals or clamps;
   whereby successive manipulations of said manual switches produces indications of defects in each of said circuits without the use of further manual manipulation.

2. The apparatus of claim 1 including in combination a storage battery charging device positioned within said box, said charging device being characterized by:
   means for connecting to an outside input source of alternating current power;
   output terminals of direct current charging power;
   said output terminals being adapted for connecting to the terminals of said storage battery;
   said output terminals being further connected to said internal test circuit;
   whereby said outside source of alternating current may be utilized to test said electrical systems and to charge said battery simultaneous and permit testing of said systems without the use of said battery.

* * * * *